United States Patent
Huang et al.

(10) Patent No.: US 10,533,088 B2
(45) Date of Patent: Jan. 14, 2020

(54) COPOLYMER AND RESIN COMPOSITION INCLUDING THE SAME

(71) Applicant: INDUSTRIAL TECHNOLOGY RESEARCH INSTITUTE, Hsinchu (TW)

(72) Inventors: Yao-Jheng Huang, Taipei (TW); Yun-Yu Lai, Qionglin Township (TW); Ming-Tzung Wu, Mailiao Township (TW); Te-Yi Chang, Taoyuan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 35 days.

(21) Appl. No.: 16/103,174

(22) Filed: Aug. 14, 2018

(65) Prior Publication Data

US 2019/0241730 A1 Aug. 8, 2019

(30) Foreign Application Priority Data

Feb. 8, 2018 (TW) .............................. 107104497 A

(51) Int. Cl.
*C08L 43/04* (2006.01)
*C08F 2/48* (2006.01)
*C08F 222/06* (2006.01)
*C08F 212/08* (2006.01)

(52) U.S. Cl.
CPC ................ *C08L 43/04* (2013.01); *C08F 2/48* (2013.01); *C08F 212/08* (2013.01); *C08F 222/06* (2013.01); *C08L 2203/20* (2013.01)

(58) Field of Classification Search
None
See application file for complete search history.

(56) References Cited

U.S. PATENT DOCUMENTS

| | | | | |
|---|---|---|---|---|
| 4,250,240 A | | 2/1981 | Shimada et al. | |
| 4,399,261 A | * | 8/1983 | Kato | C08K 5/544 |
| | | | | 525/326.5 |
| 4,427,824 A | * | 1/1984 | Kato | C09B 67/006 |
| | | | | 523/212 |
| 4,451,602 A | * | 5/1984 | Furukawa | C08K 5/54 |
| | | | | 524/114 |
| 4,690,993 A | * | 9/1987 | Falcetta | C08F 30/08 |
| | | | | 526/242 |
| 4,772,672 A | * | 9/1988 | Isozaki | C08F 230/08 |
| | | | | 526/189 |
| 4,972,027 A | * | 11/1990 | Isozaki | C08F 2/08 |
| | | | | 525/286 |
| 5,039,761 A | * | 8/1991 | Ono | C08F 283/124 |
| | | | | 525/479 |
| 5,063,114 A | * | 11/1991 | Nambu | C09D 133/066 |
| | | | | 428/384 |
| 5,344,880 A | * | 9/1994 | Nambu | C08L 33/066 |
| | | | | 525/100 |
| 7,015,256 B2 | | 3/2006 | Ito et al. | |
| 7,285,371 B2 | | 10/2007 | Huang et al. | |

(Continued)

FOREIGN PATENT DOCUMENTS

| CN | 1810875 A | 8/2006 |
|---|---|---|
| CN | 101641418 A | 2/2010 |

(Continued)

OTHER PUBLICATIONS

Taiwanese Notice of Allowance for Appl. No. 107104497 dated Nov. 19, 2018.
Chao et al., "Characterizing the complex permittivity of high-κ dielectrics using enhanced field method", Review of Scientific Instruments, vol. 86, 2015, pp. 114701-1-114701-5.
Kim et al., "High performance encapsulant for light-emitting diodes (LEDs) by a sol-gel derived hydrogen siloxane hybrid", Journal of Materials Chemistry, vol. 22, 2012, pp. 7954-7960.
Kim et al., "Thermally Stable Siloxane Hybrid Matrix with Low Dielectric Loss for Copper-Clad Laminates for High-Frequency Applications", ACS Applied Materials and Interfaces, vol. 8, 2016, pp. 8335-8340.

(Continued)

*Primary Examiner* — Robert S Loewe
(74) *Attorney, Agent, or Firm* — Birch, Stewart, Kolasch & Birch, LLP

(57) ABSTRACT

A copolymer is provided, which includes 1 part by mole of a repeating unit represented by Formula 1, 3 to 10 parts by mole of a repeating unit represented by Formula 2, and 5 to 15 parts by mole of a repeating unit represented by Formula 3. $R^1$ is hydrogen or methyl; $R^2$ is a single bond or $C_{1-3}$ alkylene group; $R^3$ is a polysiloxy group with vinyl and aromatic group; and each of $R^4$ and $R^5$ is independently hydrogen, $C_{1-3}$ alkyl or a polysiloxy group with vinyl and aromatic group.

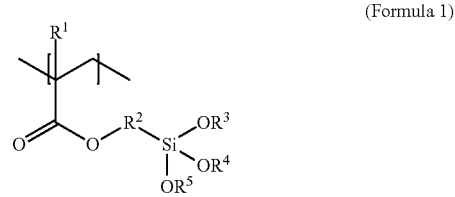

(Formula 1)

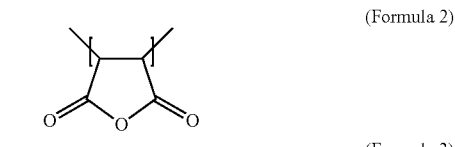

(Formula 2)

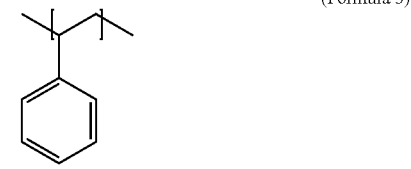

(Formula 3)

9 Claims, No Drawings

(56) References Cited

U.S. PATENT DOCUMENTS

| | | |
|---|---|---|
| 7,297,360 B2 | 11/2007 | Yoshioka et al. |
| 8,168,689 B2 | 5/2012 | Weng et al. |
| 8,263,308 B2 | 9/2012 | Tagami et al. |
| 8,455,093 B2 | 6/2013 | Chang et al. |
| 8,593,713 B2 | 11/2013 | Wu et al. |
| 9,580,567 B2 | 2/2017 | Nonaka et al. |
| 9,698,377 B1 | 7/2017 | Wu et al. |
| 2013/0037094 A1 | 2/2013 | Wang et al. |

FOREIGN PATENT DOCUMENTS

| | | |
|---|---|---|
| CN | 1991582 B | 4/2010 |
| CN | 101792633 A | 8/2010 |
| CN | 102666749 A | 9/2012 |
| CN | 102930920 A | 2/2013 |
| JP | 8-320567 A | 12/1996 |
| TW | 200643633 | 12/2006 |
| TW | 200736837 | 10/2007 |
| TW | I299815 | 8/2008 |
| TW | I330757 | 9/2010 |
| TW | 201437762 A | 10/2014 |
| TW | I489212 B | 6/2015 |
| TW | 201739774 A | 11/2017 |

OTHER PUBLICATIONS

Kim et al., "Thermally Stable Transparent Sol-Gel Based Siloxane Hybrid Material with High Refractive Index for Light Emitting Diode (LED) Encapsulation", Chemistry of Materials Article, vol. 22, 2010, 3549-3555.

Malins et al., "Alternating copolymers of functionalized α-methyl styrene monomers and maleic anhydride", Polymer Chemistry, 2015, pp. 6543-6552.

* cited by examiner

COPOLYMER AND RESIN COMPOSITION INCLUDING THE SAME

CROSS-REFERENCE TO RELATED APPLICATION

This application claims the priority benefit of Taiwan application serial no. 107104497, filed on Feb. 8, 2018. The entirety of the above-mentioned patent application is hereby incorporated by reference herein and made a part of this specification.

TECHNICAL FIELD

The disclosure relates to a copolymer including three different repeating units and a resin composition including the same.

BACKGROUND

Existing mobile devices or displays are developed to be flexible devices. Most research on flexible devices focuses on the flexibility of substrates, but it is also crucial that the elements of devices are flexible. For instance, if the layered elements in a device are deposed on a flexible substrate but they are not flexible (or they have poor flexibility), the device cannot be regarded as a real flexible device. On the other hand, said layered elements must have characteristics such as high thermal resistance, high transmittance, and low dielectricity to meet the needs of flexible devices. If the materials making up said layered elements are sensitive to light, the elements can be used as photoresist layers. In this way, the resolution of photoresist layers will depend on the composition of layered elements.

Based on the above information, a novel composition of layered elements in a flexible device to be used as a photoresist to form a patterned unit in the flexible device is required.

SUMMARY

The present disclosure provides a copolymer, which includes 1 part by mole of a repeating unit represented by Formula 1, 3 to 10 parts by mole of a repeating unit represented by Formula 2, and 5 to 15 parts by mole of a repeating unit represented by Formula 3.

(Formula 1)

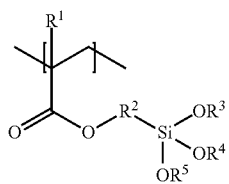

(Formula 2)

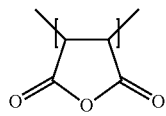

(Formula 3)

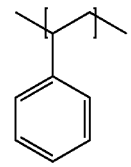

Wherein $R^1$ is hydrogen or methyl; $R^2$ is a single bond or $C_{1-3}$ alkylene group; $R^3$ is a polysiloxy group with vinyl and aromatic group; and each of $R^4$ and $R^5$ is independently hydrogen, $C_{1-3}$ alkyl or a polysiloxy group with vinyl and aromatic group.

The present disclosure provides a resin composition, which includes 1 part by weight of the aforementioned copolymer; 0.01 to 0.1 parts by weight of an initiator; and 0.05 to 0.6 parts by weight of a crosslinkable monomer.

Several exemplary embodiments accompanied by figures are described in detail below to describe the details of the disclosure further.

DESCRIPTION OF THE EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

As used in the specification and claims, the singular forms "a", "an" and "the" include plural references unless the context clearly dictates otherwise.

The present disclosure is a copolymer, which includes 1 part by mole of a repeating unit represented by Formula 1, 3 to 10 parts by mole of a repeating unit represented by Formula 2, and 5 to 15 parts by mole of a repeating unit represented by Formula 3.

(Formula 1)

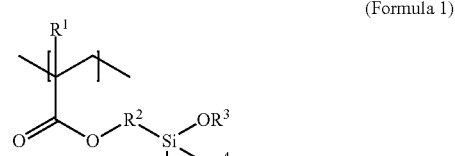

(Formula 2)

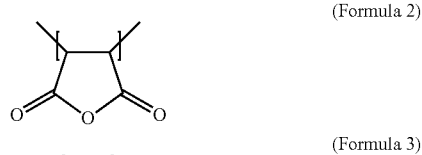

(Formula 3)

Wherein $R^1$ is hydrogen or methyl, and $R^2$ is a single bond or $C_{1-3}$ alkylene group. In one embodiment, $R^1$ is hydrogen, and $R^2$ is propyl. $R^3$ is a polysiloxy group with vinyl and aromatic group. Each of $R^4$ and $R^5$ is independently hydrogen, $C_{1-3}$ alkyl or a polysiloxy group with vinyl and aromatic group. On the other hand, $R^4$ and/or $R^5$ may be the same with $R^3$ which is a polysiloxy group with vinyl and aromatic group. In other embodiments, $R^4$ and/or $R^5$ may be hydrogen or lower alkyl such as methyl. The repeating unit represented by Formula 1 having a polysiloxy group with vinyl and aromatic group may enhance heat resistance, chemical resistance and compatibility of the copolymer. The repeating unit represented by Formula 2 may enhance the developing capacity of the copolymer. When the ratio of the repeating unit represented by Formula 2 is too low, the resolution of development is poor (more than 10 μm). When the ratio of the repeating unit represented by Formula 2 is too high, it would result in line-peeling or uneven patterns due to over-development. The repeating unit represented by Formula 3 may enhance heat resistance and compatibility with the repeating unit represented by Formula 1. When the ratio of the repeating unit represented by Formula 3 is too low, the heat resistance and compatibility are poor. When the ratio of the repeating unit represented by Formula 3 is too high, the flexibility would become poor. In one embodiment, the above copolymer has a weight average molecular weight of 5000 to 10000. When the weight average molecular weight of the copolymer is too low, the flexibility would become poor. When the weight average molecular weight of the copolymer is too high, it would result in poor developing capacity and affect the crosslinking reaction.

In one embodiment, the polysiloxy group with vinyl and aromatic group in Formula 1 includes 1 part by mole of the repeating unit represented by Formula 4, and 0.01 to 1 parts by mole of the repeating unit represented by Formula 5.

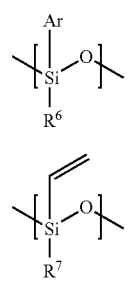

(Formula 4)

(Formula 5)

Wherein Ar is phenyl, naphthyl, pyrenyl, anthryl, phenanthryl, triphenylenyl, or the like. $R^6$ is $C_{1-3}$ alkyl, alkenyl, phenyl, naphthyl, pyrenyl, anthryl, phenanthryl or triphenylenyl. $R^7$ is $C_{1-3}$ alkyl or phenyl. In one embodiment, Ar is phenyl, $R^6$ is phenyl, and $R^7$ is methyl. The repeating unit represented by Formula 4 has high heat resistance. When the ratio of the repeating unit represented by Formula 4 is too low, the heat resistance is poor. When the ratio of the repeating unit represented by Formula 4 is too high, it is prone to embrittlement. The repeating unit represented by Formula 5 may conduct a crosslinking reaction to provide chemical resistance. When the ratio of the repeating unit represented by Formula 5 is too low, the degree of crosslinking is insufficient to form a film. When the ratio of the repeating unit represented by Formula 5 is too high, it is prone to embrittlement due to the high degree of crosslinking.

In other embodiments, the polysiloxy group with vinyl and aromatic group in Formula 1 further includes 0 to 1 parts by mole of the repeating unit represented by Formula 6.

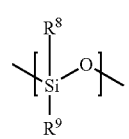

(Formula 6)

Wherein each of $R^8$ and $R^9$ is independently $C_{1-3}$ alkyl. In one embodiment, $R^8$ and $R^9$ are methyl. The repeating unit represented by Formula 6 may enhance compatibility between the copolymer and the resin formulation. When the ratio of the repeating unit represented by Formula 6 is too low, it would result in phase separation.

In one embodiment, the polysiloxy group with vinyl and aromatic group has a weight average molecular weight of 2000 to 3000. When the weight average molecular weight of the polysiloxy group with vinyl and aromatic group is too low, it would not have the property of oligomer. When the weight average molecular weight of the polysiloxy group with vinyl and aromatic group is too high, it would result in poor reactivity and a low grafting rate.

In one embodiment, a polymer (1) may react with a polysiloxy with vinyl and aromatic group (2) to form the above copolymer. The polymer (1) may be made by a polymerization of styrene, maleic anhydride, and a repeating unit represented by Formula 7. In Formula 7, each R' is independently hydrogen or $C_{1-3}$ alkyl. $R^1$ and $R^2$ are described above and that description is not repeated here.

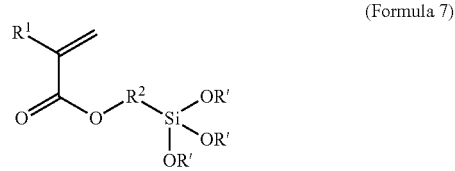

(Formula 7)

The polysiloxy with vinyl and aromatic group (2) may be made by a reaction of the silanes represented by Formula 8, Formula 9, and optionally Formula 10. In Formula 8 to Formula 10, each R" is independently hydrogen or $C_{1-3}$ alkyl. $R^6$, $R^7$, $R^8$, and $R^9$ are described above and that description is not repeated here.

(Formula 8)

(Formula 9)

(Formula 10)

The present disclosure provides a resin composition, which includes 1 part by weight of the above copolymer; 0.01 to 0.1 parts by weight of an initiator; and 0.05 to 0.6 parts by weight of a crosslinkable monomer. In one embodiment, the resin composition of the present disclosure may be formulated by mixing the above copolymer, initiator, and crosslinkable monomer. When the ratio of the initiator is too low, the degree of polymerization would be too low to have the properties of polymers. When the ratio of the initiator is too high, the resin composition is prone to embrittlement due to the high degree of polymerization. When the ratio of the crosslinkable monomer is too low, it cannot be cured due to the low degree of crosslinking. When the ratio of the crosslinkable monomer is too high, it would be prone to embrittlement.

In one embodiment, the crosslinkable monomer may be exemplified by glyceryl acrylate, dipentaerythritol hexaacrylate, ethylene glycol diacrylate, triethylene glycol diacrylate, 1,4-butanediol diacrylate, 1,6-hexanediol diacrylate, neopentyl glycol diacrylate, pentaerythritol diacrylate, pentaerythritol triacrylate, dipentaerythritol triacrylate, dipentaerythritol acrylate, pentaerythritol hexaacrylate, bisphenol A diacrylate, trimethylolpropane triacrylate, novolac epoxy acrylate, ethylene glycol dimethacrylate, diethylene glycol dimethacrylate, triethylene glycol dimethacrylate, dipropylene glycol dimethacrylate, 1,4-butanediol dimethacrylate, 1,6-hexanediol dimethacrylate, hydroxyethyl methacrylate, isooctyl acrylate, hydroxyethyl acrylate, methyl methacrylate, methacrylic acid, acrylic acid, or a mixture thereof.

In one embodiment, when the resin composition is used as a photoresist, the initiator may be a photo initiator being exemplified by acetophenone such as 2-methyl-1-(4-(methylthio)phenyl)-2-morpholino-propanone, 1-hydroxycyclohexyl phenyl ketone, diethoxyacetophenone, 2-hydroxy-2-methyl-1-phenyl-propane-1-one, 2-benzyl-2-(dimethylamino)-1-[4-(morpholinyl)phenyl]-1-butanone, or the like; benzoin such as benzoin, benzoin methyl ether, benzyl dimethyl ketal, or the like; diphenylketone such as benzophenone, 4-phenyl benzophenone, hydroxyl benzophenone, or the like; thioxanthone such as isopropyl thioxanthone, 2-chlorothioxanthone, or the like; and anthraquinone such as 2-ethylanthraquinone or the like. The photo initiator can be used alone or in a combination for a faster photosensitive speed. For example, the isopropyl thioxanthone and the 2-benzyl-2-(dimethylamino)-1-[4-(morpholinyl)phenyl]-1-butanone may be combined.

In one embodiment, when the resin composition is used as a planarization layer or a dielectric layer for a semiconductor device such as a flexible semiconductor device, the initiator may be a thermal initiator being exemplified by an azo compound such as 2,2'-azobis(2,4-dimethyl valeronitrile), dimethyl 2,2'-azobis(2-methylpropionate), 2,2-azobisisobutyronitrile (AIBN), 2,2-azobis(2-methylisobutyronitrile), 1,1'-azobis(cyclohexane-1-carbonitrile), 2,2'-azobis[N-(2-propenyl)-2-methylpropionamide], 1-[(cyano-1-methylethyl)azo]formamide, 2,2'-azobis(N-butyl-2-methylpropionamide), 2,2'-azobis(N-cyclohexyl-2-methylpropionamide), or the like; and a peroxide compound such as benzoyl peroxide, 1,1-bis(tert-butylperoxy)cyclohexane, 2,5-bis(tert-butylperoxy)-2,5-dimethylcyclohexane, 2,5-bis(tert-butylperoxy)-2,5-dimethyl-3-cyclohexyne, bis(1-(tert-butylpeorxy)-1-methy-ethyl)benzene, tert-butyl hydroperoxide, tert-butyl peroxide, tert-butyl peroxybenzoate, cumene hydroperoxide, cyclohexanone peroxide, dicumyl peroxide, lauroyl peroxide, or the like. The thermal initiator can be used alone or in a combination if necessary.

According to experimental results, the layered elements or patterns being made by curing the above resin composition have properties such as low dielectric constant, small bending radius, high transmittance, high heat resistance (yellowing resistance), and so on. In addition to having the properties described above, the patterns formed by the resin composition have a resolution that is less than 30 μm when the above resin composition is used as a photoresist. In summary, the resin composition of this present disclosure is suitable for use in flexible devices such as mobile devices, displays, etc.

Below, exemplary embodiments will be described in detail so as to be easily realized by a person having ordinary knowledge in the art. The inventive concept may be embodied in various forms without being limited to the exemplary embodiments set forth herein.

EXAMPLES

Preparation Example 1

The part by mole of monomers (3-methacryloxypropyltrimethoxysilane, styrene, and maleic anhydride) were taken according to Table 1, and 5 phr of 2,2-azobisiso butyronitrile (AIBN) was used as an initiator, based on the total weight of monomers. These monomers and the initiator were mixed with 75 ml of butanone, and heated to 80° C. and maintained for 4 hours to obtain a copolymer, shown as Formula 11.

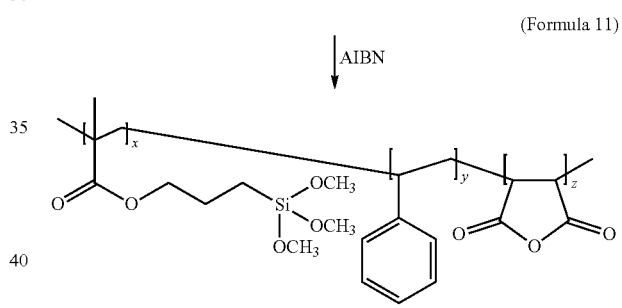

(Formula 11)

In Formula 11, x, y and z are respectively the parts by mole of 3-methacryloxypropyltrimethoxysilane, styrene, and maleic anhydride, and the copolymer belongs to a random copolymer. The monomer amount, number average molecular weight (Mn), weight average molecular weight (Mw), solid content, and average viscosity (at 25° C.) of the above copolymer are shown in Table 1. The number average molecular weight (Mn) and weight average molecular weight (Mw) of the above copolymer were measured by Gel Permeation Chromatography (WATERS Model 600), and the average viscosity of the above copolymer was measured at 25° C. by a viscometer (BROOKFIELD).

TABLE 1

|  | 3-Methacryloxy-propyltri-methoxysilane (part by mole) | Styrene (part by mole) | Maleic Anhydride (part by mole) | Mn | Mw | Solid Content | Average Viscosity |
| --- | --- | --- | --- | --- | --- | --- | --- |
| 1-1 | 1 | 8.65 | 9.5 | 2439 | 5388 | 25 ± 0.5% | 100 ± 5 cps |
| 1-2 | 1 | 12.1 | 6 | 3160 | 7436 | 25 ± 0.5% | 100 ± 5 cps |
| 1-3 | 1 | 13.7 | 4.35 | 1586 | 2881 | 25 ± 0.5% | 100 ± 5 cps |

Preparation Example 2

The parts by mole of monomers (diphenylsilanediol, dimethoxydimethylsilane, and dimethoxymethylvinylsilane) were taken according to Table 2, and the different mol % of barium hydroxide was used as a base catalyst, based on the total mole number of monomers. The monomers and the base catalyst were mixed under nitrogen atmosphere, and heated to 60° C. to conduct a Sol-Gel reaction for 12 hours. Then, the solvent (methanol and water) was removed by concentration under reduced pressure to obtain a polysiloxane, shown as Formula 12.

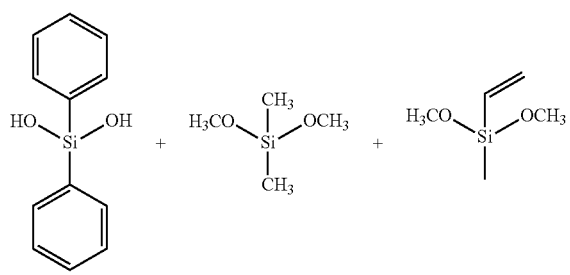

(Formula 12)

In Formula 12, m, n and o are respectively the parts by mole of diphenylsilanediol, dimethoxydimethylsilane, and dimethoxymethylvinylsilane, and the polysiloxane belongs to a random copolymer. The monomer amount, weight average molecular weight (Mw), and solid content of the above polysiloxane are shown in Table 2. The weight average molecular weight (Mw) of the above copolymer were measured by Gel Permeation Chromatography (WATERS Model 600).

TABLE 2

| | Diphenyl-silanediol (part by mole) | Dimethoxy-dimethyl silane (part by mole) | Dimethoxy-methylvinyl silane (part by mole) | Ba(OH)$_2$ | Mw | Solid Content |
|---|---|---|---|---|---|---|
| 2-1 | 1 | 0 | 1 | 0.2 mol % | 2395 | 80% |
| 2-2 | 1 | 0.5 | 0.5 | 0.2 mol % | 2536 | 80% |
| 2-3 | 1 | 1 | 0 | 0.2 mol % | 2453 | 80% |

Preparation Example 3

The copolymer of Preparation Example 1 and the polysiloxane of Preparation Example 2 were mixed with 75 ml of butanone, and heated to 60° C. to conduct a reaction for 10 hours, shown as Formula 13.

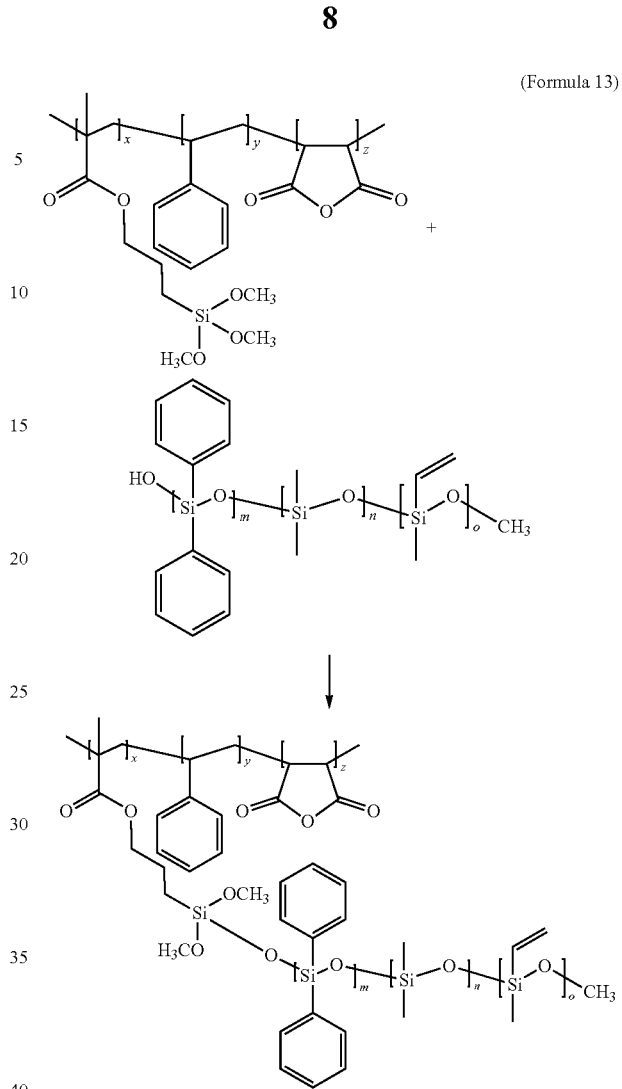

(Formula 13)

In Formula 13, x, y, z, m, n and o are described above and are not repeated here. The copolymer and the polysiloxane belong to random copolymers. The selection and amount of the above copolymer and polysiloxane, and solid content and average viscosity (at 25° C.) of the product are shown in Table 3. The average viscosity of the above copolymer was measured at 25° C. by a viscometer (BROOKFIELD).

TABLE 3

| | Copolymer (part by mole) | Polysiloxane (part by mole) | Solid Content | Average Viscosity |
|---|---|---|---|---|
| 3-1 | Preparation Example 1-1 (1) | Preparation Example 2-2 (1) | 25% | 100 ± 5 cps |
| 3-2 | Preparation Example 1-1 (1) | Preparation Example 2-2 (0.1) | 25% | 100 ± 5 cps |
| 3-3 | Preparation Example 1-1 (1) | Preparation Example 2-2 (0.05) | 25% | 100 ± 5 cps |
| 3-4 | Preparation Example 1-2 (1) | Preparation Example 2-2 (1) | 25% | 100 ± 5 cps |
| 3-5 | Preparation Example 1-2 (1) | Preparation Example 2-2 (0.1) | 25% | 100 ± 5 cps |

TABLE 3-continued

| | Copolymer (part by mole) | Polysiloxane (part by mole) | Solid Content | Average Viscosity |
|---|---|---|---|---|
| 3-6 | Preparation Example 1-2 (1) | Preparation Example 2-2 (0.05) | 25% | 100 ± 5 cps |
| 3-7 | Preparation Example 1-3 (1) | Preparation Example 2-2 (1) | 25% | 100 ± 5 cps |
| 3-8 | Preparation Example 1-3 (1) | Preparation Example 2-2 (0.1) | 25% | 100 ± 5 cps |
| 3-9 | Preparation Example 1-3 (1) | Preparation Example 2-2 (0.05) | 25% | 100 ± 5 cps |

Examples 1~6 and Comparison Examples 1~6

5 part by weight of a product of Preparation Example 1 or Preparation Example 3, 0.2 part by weight of a photo initiator (Irgacure OXE01, purchased from BTC CHEMICAL CORP.), and 1 part by weight of crosslinkable monomer (M400, purchased from DOUBLE BOND CHEMICAL IND., CO., LTD.) were mixed to form a resin composition. The above resin composition was coated on a substrate, and exposed to light by using a test photomask with different line widths and developed to obtain a pattern so as to determine the resolution of pattern. Furthermore, the above resin composition coated on a substrate was directly exposed to light to form a whole film so as to measure a dielectric constant and a bending radius of the film. The measurement method of a dielectric constant may refer to Chao, H.-W.; Wong, W.-S.; Chang, T.-H., Characterizing the complex permittivity of high-κ dielectrics using enhanced field method. Review of Scientific Instruments 2015, 86 (11), 114701; the measurement method of a bending radius may refer to IEC 62715-6-1 Standard. The dielectric constant, the bending radius, and the resolution of resist pattern are shown in Table 4.

It can be seen from the above information that the copolymer having a polysiloxane may improve the flexibility of film made from the resin composition and decrease the dielectric constant of the film.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A copolymer, comprising:
   1 part by mole of a repeating unit represented by Formula 1;
   3 to 10 parts by mole of a repeating unit represented by Formula 2; and
   5 to 15 parts by mole of a repeating unit represented by Formula 3:

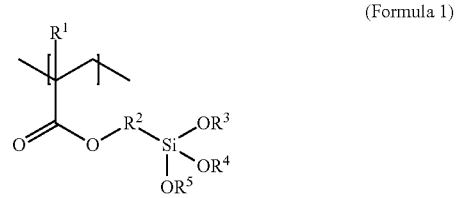

(Formula 1)

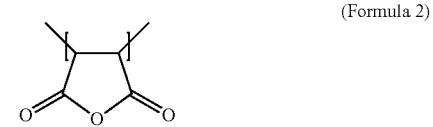

(Formula 2)

TABLE 4

| | Main Component | Polysiloxane/ Copolymer Molar Ratio | o/(m + n) Double Bond Molar Ratio | z/(x + y) Anhydride Molar Ratio | Dielectric Constant | Resolution | Bending Radius (r) | Appearance |
|---|---|---|---|---|---|---|---|---|
| Comparison Example 1 | Preparation Example 1-1 | 0 | 0 | 0.98 | 3.24 | ≤10 μm | r ≥ 100 mm | Transparent |
| Comparison Example 2 | Preparation Example 1-2 | 0 | 0 | 0.458 | 2.87 | 10~30 μm | r ≥ 100 mm | Transparent |
| Comparison Example 3 | Preparation Example 1-3 | 0 | 0 | 0.296 | 2.85 | ≥30 μm | Crack | Transparent |
| Comparison Example 4 | Preparation Example 3-1 | 0.055 | 0.33 | 0.98 | 2.941 | ≤10 μm | r ≤ 3 mm | Foggy White (Phase Separation) |
| Comparison Example 5 | Preparation Example 3-4 | 0.055 | 0.33 | 0.458 | 2.747 | 10~30 μm | r ≤ 3 mm | Foggy White (Phase Separation) |
| Comparison Example 6 | Preparation Example 3-7 | 0.055 | 0.33 | 0.296 | 2.737 | ≥30 μm | r ≤ 3 mm | Foggy White (Phase Separation) |
| Example 1 | Preparation Example 3-2 | 0.0055 | 0.33 | 0.98 | 2.922 | ≤10 μm | r ≤ 3 mm | Transparent |
| Example 2 | Preparation Example 3-3 | 0.0027 | 0.33 | 0.98 | 2.877 | ≤10 μm | r ≤ 3 mm | Transparent |
| Example 3 | Preparation Example 3-5 | 0.0055 | 0.33 | 0.458 | 2.745 | 10~30 μm | r ≤ 3 mm | Transparent |
| Example 4 | Preparation Example 3-6 | 0.0027 | 0.33 | 0.458 | 2.742 | 10~30 μm | r ≤ 3 mm | Transparent |
| Example 5 | Preparation Example 3-8 | 0.0055 | 0.33 | 0.296 | 2.734 | ≥30 μm | r ≤ 3 mm | Transparent |
| Example 6 | Preparation Example 3-9 | 0.0027 | 0.33 | 0.296 | 2.733 | ≥30 μm | r ≤ 3 mm | Transparent |

(Formula 3)

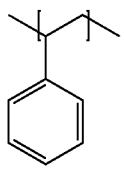

wherein $R^1$ is hydrogen or methyl;
$R^2$ is a single bond or $C_{1-3}$ alkylene group;
$R^3$ is a polysiloxy group with vinyl and aromatic group; and
each of $R^4$ and $R^5$ is independently hydrogen, $C_{1-3}$ alkyl or a polysiloxy group with vinyl and aromatic group.

2. The copolymer as claimed in claim 1, wherein the copolymer has a weight average molecular weight of 5000 to 10000.

3. The copolymer as claimed in claim 1, wherein the polysiloxy group with vinyl and aromatic group has a weight average molecular weight of 2000 to 3000.

4. The copolymer as claimed in claim 1, wherein the polysiloxy group with vinyl and aromatic group comprises 1 part by mole of a repeating unit represented by Formula 4, and 0.01 to 1 parts by mole of a repeating unit represented by Formula 5:

(Formula 4)

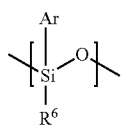

(Formula 5)

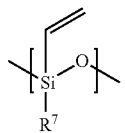

wherein Ar is phenyl, naphthyl, pyrenyl, anthryl, phenanthryl or triphenylenyl; $R^6$ is $C_{1-3}$ alkyl, alkenyl, phenyl, naphthyl, pyrenyl, anthryl, phenanthryl or triphenylenyl; and $R^7$ is $C_{1-3}$ alkyl or phenyl.

5. The copolymer as claimed in claim 4, wherein the polysiloxy group with vinyl and aromatic group further comprises 0 to 1 parts by mole of a repeating unit represented by Formula 6:

(Formula 6)

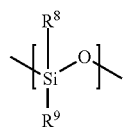

wherein each of $R^8$ and $R^9$ is independently $C_{1-3}$ alkyl.

6. A resin composition, comprising:
1 part by weight of the copolymer as claimed in claim 1;
0.01 to 0.1 parts by weight of an initiator; and
0.05 to 0.6 parts by weight of a crosslinkable monomer.

7. The resin composition as claimed in claim 6, wherein the initiator is a photo initiator, and the resin composition is used as a photoresist.

8. The resin composition as claimed in claim 6, wherein the initiator is a thermal initiator, and the resin composition is used as a planarization layer or a dielectric layer for a semiconductor device.

9. The resin composition as claimed in claim 8, wherein the semiconductor device is a flexible semiconductor device.

\* \* \* \* \*